(12) United States Patent
Chatterjee

(10) Patent No.: US 6,502,118 B1
(45) Date of Patent: Dec. 31, 2002

(54) FAST SYSTEM AND METHOD FOR PRODUCING A LOGARITHMIC SIGNAL APPROXIMATION WITH VARIABLE PRECISION

(75) Inventor: Manjirnath Chatterjee, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/815,033

(22) Filed: Mar. 22, 2001

(51) Int. Cl.[7] ............................................. G06F 7/556
(52) U.S. Cl. ...................................... 708/517; 708/277
(58) Field of Search ............................... 708/517, 277, 708/512

(56) References Cited

U.S. PATENT DOCUMENTS 5,363,321 A * 11/1994 Trong et al. ................ 708/517
5,524,089 A * 6/1996 Takano ....................... 708/517
5,951,629 A * 9/1999 Wertheim et al. ........... 708/517
6,065,031 A * 5/2000 Pan et al. .................... 708/517
6,289,367 B1 * 9/2001 Allerd ......................... 708/277

* cited by examiner

Primary Examiner—David H. Malzahn
(74) Attorney, Agent, or Firm—Hisashi D. Watanabe

(57) ABSTRACT

A system and method for producing an output logarithmic digital signal from an input digital signal having a plurality of bit values in which the output logarithmic signal has a precision defined by a parameter is described. The system (45) includes a search circuit (50), an interpolation circuit (55) in coupled with the search circuit, a shift circuit (60) in coupled with the interpolation circuit and a combiner (65) that produces an output logarithmic digital signal (90) from a received search circuit output (75) and a received shift circuit output (88).

18 Claims, 3 Drawing Sheets

FAST SYSTEM AND METHOD FOR PRODUCING A LOGARITHMIC SIGNAL APPROXIMATION WITH VARIABLE PRECISION

BACKGROUND OF THE INVENTION

This invention generally relates to computational systems and methods, and more particularly, to systems and methods that perform numerical computations such as speech recognition systems.

The need for systems capable of performing optimized logarithm computations exists in many mathematical and engineering fields. Unfortunately, at present, systems that perform logarithmic calculations fall into three categories. The first is floating point implementations of logarithms, the second is table-ized fixed-point implementations, and the third is straight integer implementations.

In the first category (floating-point implementations) floating point numbers are utilized to represent the inputs and outputs of the system. Floating-point logarithms systems are usually implemented employing a math co-processor with some form of power series or Newton-Raphson method of convergence. As a result, this category of systems requires complex circuitry and substantial processing time to obtain a final value.

Tabularized fixed-point representation systems provide a scaled integer representation of the true logarithm value. In other words, log(x) would be represented as 'y' multiplied by log(x) where 'y' is a fixed scaling factor to preserve precision. These systems draw intermediate values of the logarithm from a table. The table contains the value of log(x) to the appropriate scale at compile time. These types of systems require the creation and manipulation of a table of values and can require substantial memory space (as a result of storing intermediate values in the table) to obtain a final value.

The last category is integer truncation of the logarithm value. Systems in this category return the value of the highest bit in the argument (x). While useful for search applications where precision is not required, the lack of precision in this type of systems means that all bits on the right of the decimal place are lost. Therefore, there is a need for a system and method that produce logarithmic values with run-time specified precision quickly without utilizing tables and/or multiplications.

BRIEF DESCRIPTION OF THE DRAWINGS

The summary of the invention, as well as the following detailed description of this invention, as defined in the claims, is better understood when read in conjunction with the accompanying figures. The following figures are included by way of example, and not by way of limitation with regard to the claimed invention and are not necessarily drawn to scale.

DETAILED DESCRIPTION OF THE PREFERRED EMBODIMENTS

The present invention is a system and method for producing an output logarithmic value with run-time specific precision without utilizing tables and/or multiplications.

In accordance with the invention, a system for producing an output logarithmic digital signal from an input digital signal having a plurality of bit values wherein the output logarithmic signal has a precision defined by a parameter is described. The system comprises a means for finding the bit position of the highest bit value of the input digital signal and a means for determining an offset from the position of the highest bit value and the parameter. The system also includes a means for interpolating a shifted interpolation value from the input signal using the parameter and an adder for adding the offset, precision shifted interpolation value and bit position.

Also in accordance with the invention, a method for producing an output logarithmic digital signal from an input digital signal having a plurality of bit values wherein the output logarithmic signal has a precision defined by a parameter is described. The method comprises the steps of finding the bit position of the highest bit value of the input digital signal and determining an offset from the position of the highest bit value and the parameter. The method also includes the steps of interpolating a shifted interpolation value from the input signal using the parameter and adding the offset, precision shifted interpolation value and bit position.

Figure 1:
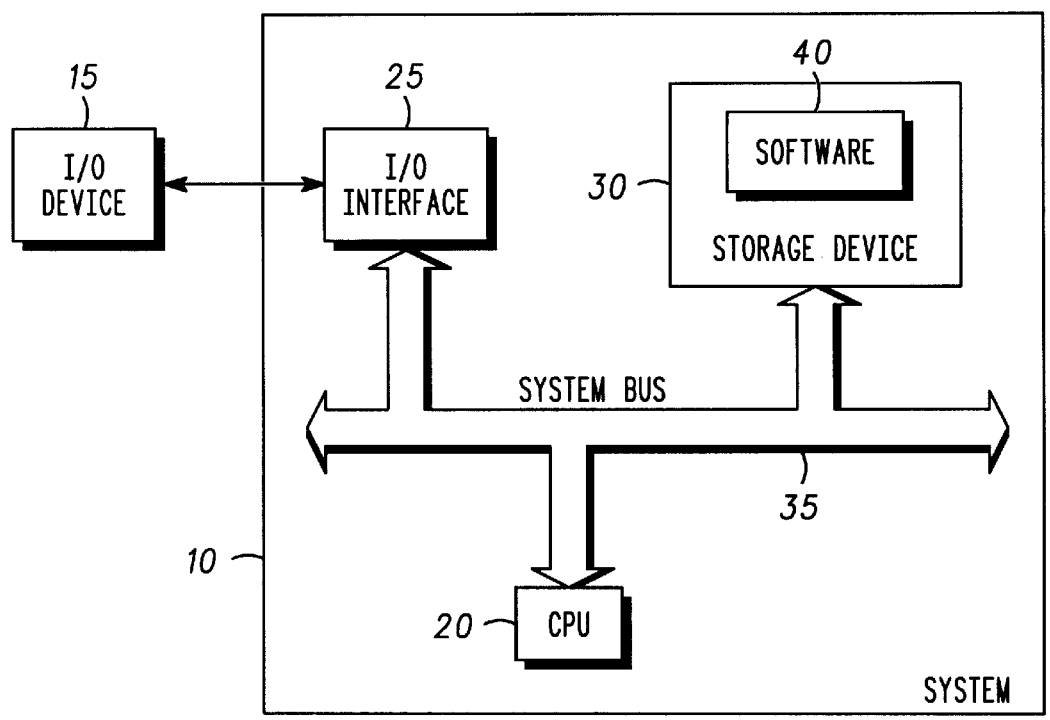
FIG. 1 is a functional block diagram for the system in accordance with the invention.

FIG. 1 illustrates the functional block diagram of a system 10. The system 10 is in signal communication with an input/output "I/O" device 15. The I/O device 15 may selectively be any input and output device combination including but not limited to a keyboard and a display monitor or printer. The system 10 includes a central processing unit "CPU" 20, an I/O interface 25, a storage device 30, and a system bus 35.

The CPU 20 may selectively be any processor capable of manipulating data from the I/O interface 25 and storage device 30. Examples of the CPU 20 include but are not limited to integrated circuit processors families such as Intel 80X86, Motorola, Inc. Power PC, Digital DEC Alpha, and other similar processor from companies such as Hewitt Packard, Inc., Sun Microsystems, IBM, AMD, Cyrix and others.

The storage device 30 may selectively be any memory type structure such as random access memory (RAM), read-only memory (ROM), permanent storage unit (such as a hard disk), removable storage unit (such as a floppy disk, DVD, or CD-ROM), or similar type unit. The storage device 30 includes a control program or software 40. The software 40 may selectively be any coded instructions that control the process of the system 10. The I/O interface 25 and the system bus 35 are a conventional computer system type interface and system bus which are well known both those skilled in the art.

In operation, a user (not shown) enters input values into the system 10 via the I/O device 15. The input values are processed by the CPU 20 utilizing the coded instructions in the software 40. The system 10 then generates output values and communicates then to the user via the I/O interface 25 and I/O device 15.

Figure 2:
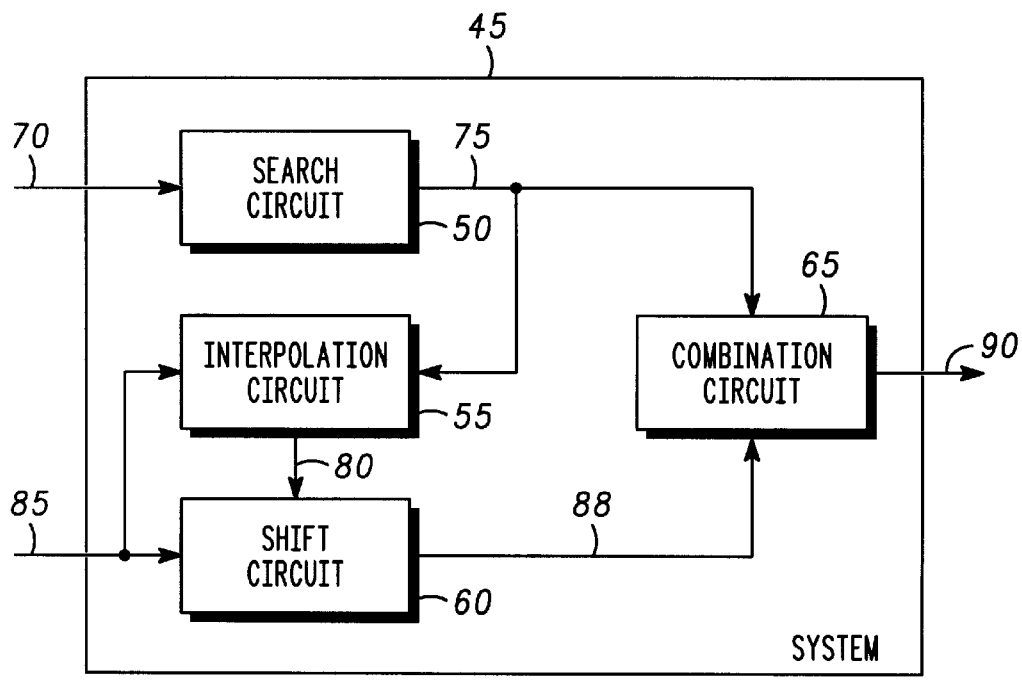
FIG. 2 is another functional block diagram for the system in accordance with the invention.

FIG. 2 is a block diagram of another example of the system 45. The system 45 comprises a search circuit 50, an interpolation circuit 55, a shift circuit 60 and a combination circuit 65. It is appreciated that search circuit 50, interpolation circuit 55, shift circuit 60 and combination circuit may selectively be implemented utilizing combination digital circuitry.

The search circuit 50 receives a digital operand signal 70 (corresponding to the operand value, i.e., 'x', for $Log_2(x)$)

from an input device such as I/O device 15, FIG. 1, and outputs a signal 75, FIG. 2, corresponding to the highest binary set bit value corresponding to the digital operand signal 70. The interpolation circuit 55 receives the signal 75 and computes a linear interpolation on the signal 75 and passes the result to the shift circuit 60 via signal path 80. In addition, the interpolation circuit 55 is a combination logic circuit capable of calculating a linear interpolation on an output from the search circuit 50 based on a precision parameter, such as a digital precision signal 85. The shift circuit 60 may receive the digital precision signal 85 (corresponding to the precision value 's') from an input device such as I/O device 15, FIG. 1, and the output of the interpolation circuit 55, FIG. 2. The shift circuit 60 generates a shift circuit output 88, which is an offset precision shifted interpolation value, and passes it to the combination circuit 65. The combination circuit 65 combines the shift circuit output 88 and the signal 75 from the search circuit 50 to produce an digital output signal 90 corresponding to the $Log_2(x)$ value that is send to an output device such as I/O device 15, FIG. 1.

Figure 3:
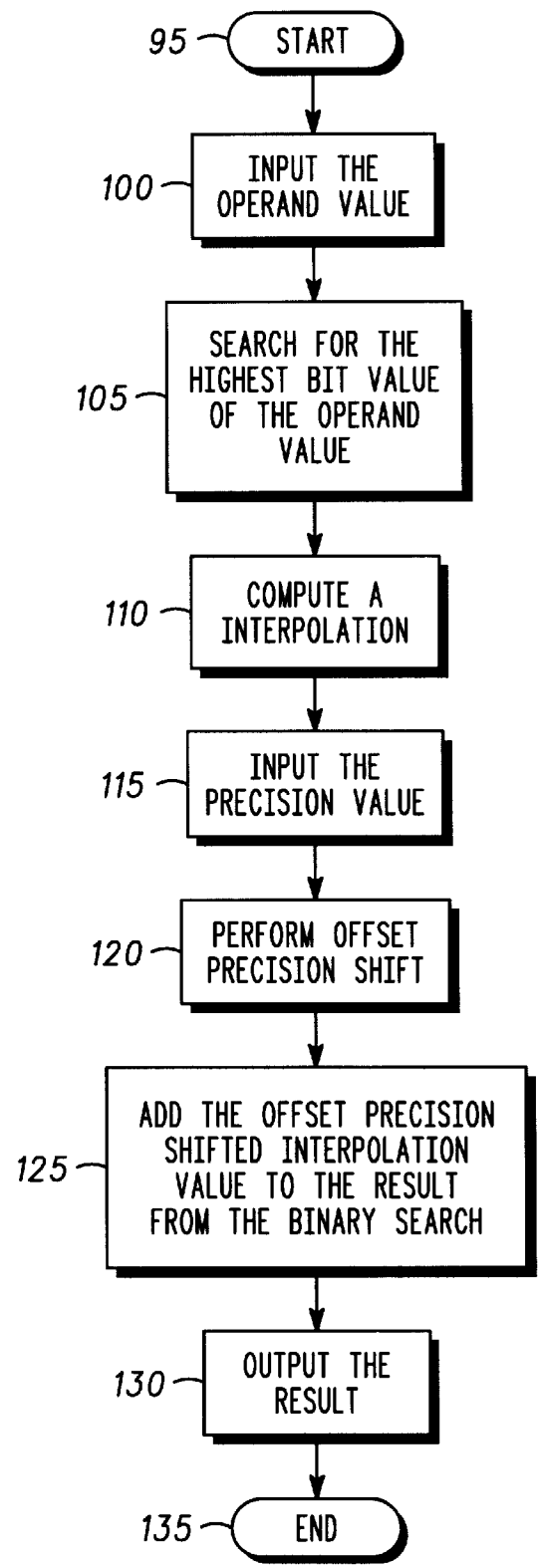
FIG. 3 is a flow chart illustrating the process performed by the systems described in FIG. 1 and FIG. 2.

FIG. 3 illustrates the process performed by the system 10 of FIG. 1 that may selectively be controlled by the coded instruction in the software 40. In step 95, FIG. 3, the system 10, FIG. 1, begins the process. In step 100 the system 10, FIG. 1, receives an input value from the I/O device 15. The input value is the operand value of the logarithm [i.e., the 'x' value for $Log_2(x)$] in binary form. In step 105, FIG. 3, the system 10, FIG. 1, determines the integer part of the log2 computation of the operand value (i.e., 'x') by searching for the highest bit value of the operand value. It is appreciated by those skilled in the art that the system 10 may perform the search by numerous means including but not limited to performing a standard binary search or a shift and search operation. The output of 105 is a rough estimate for the value $Log_2(x)$ to integer precision over an interval of estimation. In step 110, FIG. 3, the system 10, FIG. 1, computes a linear interpolation of the remaining error in the interval of estimation by performing a shift operation on the operand value that corresponds to a value equal to an approximation of the fractional portion of the log2 calculation. The system 10 then receives the precision value (i.e., 's') from the I/O device 15 in step 115, FIG. 3. In step 120 the system 10, FIG. 1, performs a precision shift on the shifted operand value corresponding to an offset precision shifted interpolation value which maps the result fractional and integer summed log2 values to the precision range input in step 115, FIG. 3. The system 10, FIG. 1, then mathematically combines the offset precision shifted interpolation value with result of the binary search in step 125. The combination is approximately equal to log2 of the value entered in step 95, FIG. 3. resulting in a peak error of 0.03125 which error over an internal [2,4000]. The system 10 then outputs the result of the combination to I/O device 15 in step 130 and the process ends in step 135. It is appreciated that the process described is equally as descriptive of process performed by system 45 of FIG. 2.

It is also appreciated that for performance purposes with current technology, the preferred embodiment of the invention is principally implemented in dedicated circuitry. However, the functions performed by the invention may also be implemented in generalized programmable circuitry capable of generating the process steps of FIG. 2. As example implementations of the process in accordance with the invention, the following pseudo-code examples are provided which may selectively be in the C programming or other equivalent programming language.

```
/************************************************
 ***************
 *Implementation of Log2( ) employing loops for binary
    bit search
 *y=Log2 (n, numbits2scale)
 *get linear interpolated scaled Log2( )
 *'x' is the number to take Log2(x), 's' is the number of bits
    to scale up
 *i.e., Log2scaled(2235,7) would return 128*Log2(2235)
 */
long Log2scaled (long x, long s)
{
    long j, v=x, f=0; /*declare local variables*/
    for (j=16; j>0; j>>=1)/*perform binary search for the
        highest set bit*/
        if ( x>(1<<j)){f+=j; x>>=j;}
    /*Next line is variable precision linear interpolation
        with offset.
        Shifts are utilized perform multiplications by powers
        of two.
    Multiply operations are represented by the '<<' symbol
while divides are are represented by '>>'.
    */
    return (f<<s)+(1<<s>>5)+((f>s)?((v+(1<<f))>>(f-s)):
        (v+(1<<f)<<(s+f)));
}
/************************************************
 ***************
 *Implementation of Log2( ) employing if statements for
    binary bit search
 *y=Log2 (n, numbits2scale)
 *get linear interpolated scaled Log2( )
 *'x' is the number to take Log2(x), 's' is the number of bits
    to scale up
 *i.e., Log2scaled(2235,7) would return 128*Log2(2235)
 */
long Log2scaled (long x, long s)
{
    long v=x, f=0; /*declare local variables*/
    if (x>(1<<16)){f+=16; x>>=16; } /*perform binary
        search for highest set bit*/
    if(x>(1<<8)){f+=8; x>>=8;}
    if (x>(1<<4)){f+=4; x>>=4;}
    if (x>(1<<2)){f+=2; x>>=2;}
    if (x>(1<<1)){f++;}
    /*Next line is variable precision linear interpolation
        with offset.
    Shifts are utilized perform multiplications by powers of
two.
    Multiply operations are represented by the '<<' symbol
while divides are represented by '>>'.
    */
    return (f<<s)+(1<<s>>5)+((f>s)?((v+(1<<f))>>(f+s)):
        v+(1<<f)<<(s+f)));
}
```

While the examples illustrate the process for obtaining base 2 logarithmic values, the process is easily expanded to other common bases such as natural logarithms "Ln(x)" or base ten (10) logarithms "$log_{10}(x)$" by scaling by the output of a $log_2(x)$ algorithm and converting it to another base. This is done by dividing the $log_2(x)$ result by a constant equal to $log_2(n)$ where n is the desired number base. As another pair of example implementations of the process utilizing the scaling factor in accordance with the invention, the following pseudo-code examples are provided which may again be selectively in the C programming or other equivalent programming language.

```
/*************************************************
*Implementation of Log( ) to other bases employing loops
    for binary bit search
*In this case the logarithmic base is chosen to be 'e' or the
    natural logarithm.
*y=Ln (n, numbits2scale)
*get linear interpolated scaled Ln( )
*'x' is the number to take Ln (x), 's' is the number of bits
    to scale up
*i.e., Lnscaled(2235,7) would return 128*Ln (2235)
*/
long Lnscaled (long x, long s)
{
    long j, v=x, f=0; /*declare local variables*/
    for (j=16; j>0; j>>=1)/*perform binary search for the
        highest set bit*/
        if (x>(1<<j)){f+=j; x>>=j;}
    /*Next line is variable precision linear interpolation
        with offset.
    Shifts are utilized perform multiplications by powers of
two.
    Multiply operations are represented by the '<<' symbol
while divides are are represented by '>>'.
    */
    return (f<<s)+(1<<s>>5)+((f>s)?((v+(1<<f))>>(f-s)):
        ((v+(1<<f))<<(s+f)));
    /*Next line converts from Log₂(x) to Ln by computing
        log₂(x)/log₂(e).*/ return (v>>1)+(v>>2)-(v>>4)+
        (v>>7)-(v>>9)-(v>>12)+(v>>15);
}
/*************************************************
*Implementation of Log ( ) to other bases employing if
    statements for binary bit search
*In this case the logarithmic base is chosen to be 'e' or the
    natural logarithm.
*y=Ln (n, numbits2scale)
*get linear interpolated scaled Ln ( )
*'x' is the number to take Ln (x), 's' is the number of bits
    to scale up
*i.e., Lnscaled(2235,7) would return 128*Log₂(2235)
*/
long Lnscaled (long x, long s)
{
    long v=x, f=0; /*declare local variables*/
    if (x>(1<<16)){f+=16; x>>=16;}/*perform binary
        search for highest set bit*/
    if (x>(1<<8)){f+=8; x>>=8;}
    if (x>(1<<4)){f+=4; x>>=4;}
    if (x>(1<<2)){f+=2; x>>=2;}
    if (x>(1<<1)){f++;}
    /*Next line is variable precision linear interpolation
        with offset.
    Shifts are utilized perform multiplications by powers of
two.
    Multiply operations are represented by the '<<' symbol
while divides are are represented by '>>'.
    */
    return (f<<s)+(1<<s>>5)+((f>s)?((v+(1<<f))>>(f+s)):
        ((v+(1<<f))<<(s+f)));
    /*Next line converts from Log₂(x) to Ln by computing
        log₂(x)/log₂(e).*/
    return (v>>1)+(v>>2)-(v>>4)+(v>>7)-(v>>9)-
        (v>>12)+(v>>15);
}
```

Figure 4:
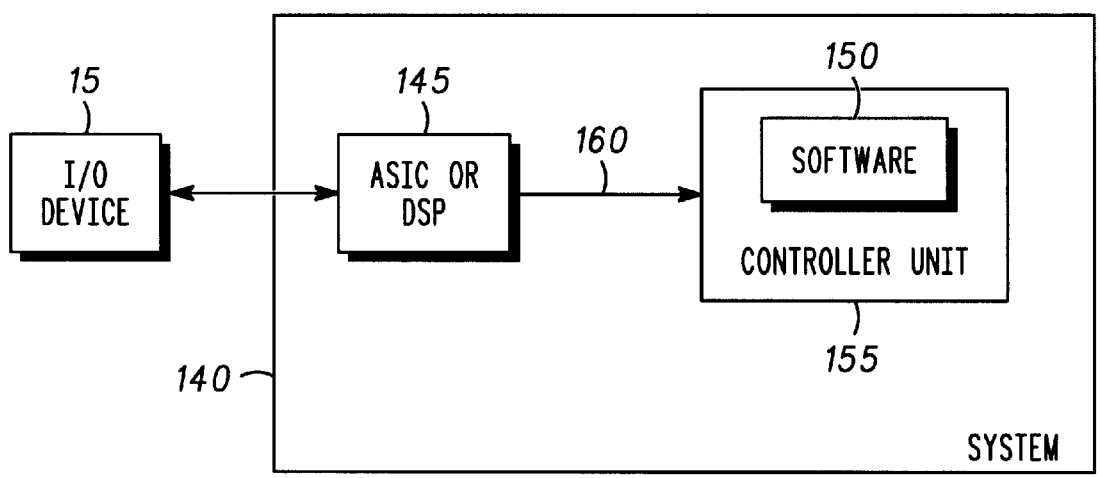
FIG. 4 is another function block diagram for the system utilizing an Application Specific Integrated Chip (ASIC) or Digital Signal Processor (DSP).

FIG. 4 is a block diagram of the system 140 in accordance with the invention utilizing a Digital Signal Processor (DSP) or Application Specific Integrated Circuit (ASIC) chip 145. It is appreciated that the system 140 may be selectively implemented in software, hardware, or a combination thereof. As an example, the elements of the system 140 may be implemented in software 150 stored in a memory located in a controller unit 155. The controller unit 155 is in signal communication with the DSP or ASIC chip 145 via communication link 160 (which may selectively be a system bus). The software 150 configures and drives the DSP or ASIC chip 145 and performs the steps described in FIG. 3.

The software 40, FIG. 1, such as a computer program, comprises an ordered listing of executable instructions for implementing logical functions. The software 40 may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While the specification in the invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrated and not restricted. To those skilled in the art the invention is susceptible to additional implementations or embodiments and certain of the details described in this application can be varied considerably, without departing from the basic principles of the invention. It will thus be appreciated that those skilled in the art will be able to devise various arrangements that, although not explicitly described or shown herein, embody the principles of the invention. They are thus within the spirit and scope.

What is claimed is:

1. A system for producing an output logarithmic digital signal from an input digital signal having a plurality of bit values wherein the output logarithmic signal has a precision defined by a parameter, the system comprising:

a search circuit;

an interpolation circuit in signal communication with the search circuit;

a shift circuit in signal communication with the interpolation circuit; and a combiner that produces an output logarithmic digital signal from a received search circuit output and a received shift circuit output.

2. The system of claim 1 wherein the interpolation circuit is a combinational logic circuit capable of calculating a linear interpolation on an output from the search circuit based on the parameter.

3. The system of claim 2 wherein the search circuit is a combinational logic circuit capable of performing a standard binary search on the input digital signal.

4. The system of claim 2 wherein the search circuit is a combinational logic circuit capable of performing a shift and search operation on the input digital signal.

5. The system of claim 1 wherein the search circuit, interpolation circuit, shift circuit and combiner are all integrated in a signal integrated circuit.

6. The system of claim 5 wherein the signal integrated circuit is application specific integrated chip.

7. A system for producing an output logarithmic digital signal from an input digital signal having a plurality of bit values wherein the output logarithmic signal has a precision defined by a parameter, the system comprising:

means for finding a bit position of a highest bit value of the input digital signal;

means for interpolating an interpolation value from the bit position;

means for determining an offset from the interpolation value; and means for adding the offset and the bit position.

8. The system of claim 7 wherein the interpolating means is a combinational logic circuit capable of calculating a linear interpolation on an output from the finding means based on the parameter.

9. The system of claim 8 wherein the finding means is a combinational logic circuit capable of performing a standard binary search on the input digital signal.

10. The system of claim 8 wherein the finding means is a combinational logic circuit capable of performing a shift and search operation on the input digital signal.

11. A method for producing an output logarithmic digital signal from an input digital signal having a plurality of bit values wherein the output logarithmic signal has a precision defined by a parameter, the method comprising:

searching for a bit position of a highest bit value of the input digital signal;

interpolating an interpolation value from the bit position;

determining an offset from the interpolation value; and adding the offset with the bit position.

12. The method of claim 11 wherein the step of interpolating further includes calculating a linear interpolation on the highest bit value based on the parameter.

13. The system of claim 12 wherein the step of searching further includes a standard binary search on the input digital signal.

14. The system of claim 12 wherein the step of searching further includes a shift and search operation on the input digital signal.

15. A computer program embodied on a computer-readable medium for producing an output logarithmic digital signal from an input digital signal having a plurality of bit values wherein the output logarithmic signal has a precision defined by a parameter, the computer program comprising:

logic configured for searching for a bit position of a highest bit value of the input digital signal;

logic configured for interpolating an interpolation value from the bit position;

logic configured for determining an offset from the interpolation value; and logic configured for adding the offset with the bit position.

16. The computer-readable medium of claim 15 wherein the interpolating logic further includes logic configured for calculating a linear interpolation on the highest bit value based on the parameter.

17. The computer-readable medium of claim 16 wherein the searching logic further includes logic configured to perform a standard binary search on the input digital signal.

18. The computer-readable medium of claim 16 wherein the searching logic further includes logic configured to perform a shift and search operation on the input digital signal.

* * * * *